Feb. 15, 1938. J. W. LYNCH 2,108,684
COFFEE MAKER
Filed Aug. 6, 1936
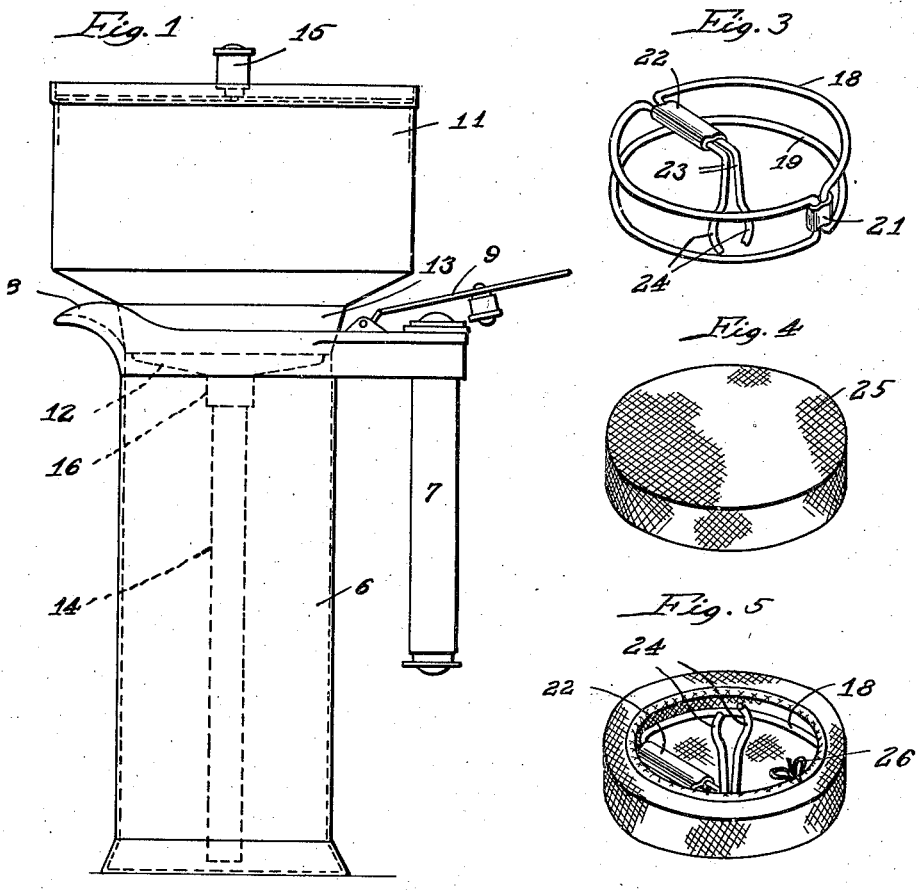
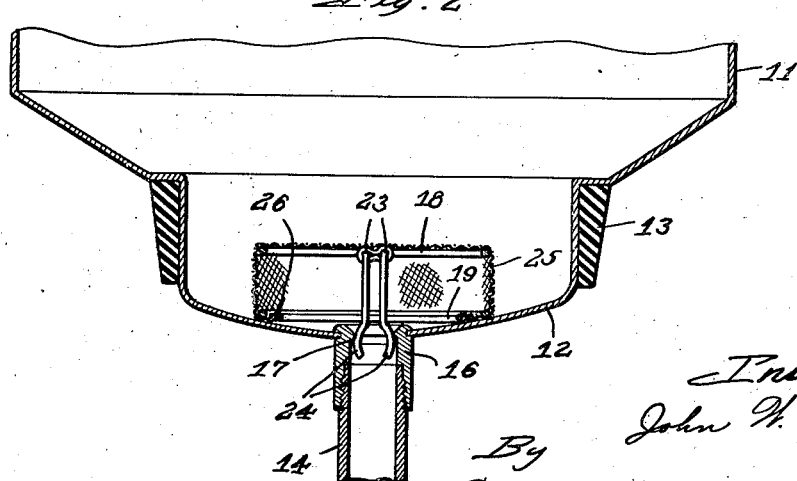
Inventor:
John W. Lynch Patented Feb. 15, 1938

2,108,684

UNITED STATES PATENT OFFICE 2,108,684

COFFEE MAKER

John W. Lynch, Chicago, Ill., assignor to Chicago Flexible Shaft Company, Chicago, Ill., a corporation of Illinois Application August 6, 1936, Serial No. 94,561

4 Claims. (Cl. 210—162)

This invention relates to coffee makers and has particular reference to a strainer construction of novel form.

Among the objects of the invention are the provision of a strainer frame formed of spaced resilient elements for holding a strainer fabric, retaining the strainer in proper position, and facilitating the removal of the strainer from the coffee maker; the provision of spring elements on the frame shaped to retain the strainer in place and permit easy removal thereof, and the provision of cheap and easily removable strainer means on the frame.

Other objects and advantages will be apparent from the following description and the accompanying drawing, in which—

Figure 1 is a side view of a coffee maker embodying my invention;

Fig. 2 is a fragmentary section through the coffee maker shown in Figure 1 showing the strainer in operative position;

Fig. 3 is a perspective view of the strainer frame;

Fig. 4 is a perspective view of the top side of the strainer, and

Fig. 5 is a perspective view of the bottom side of the strainer.

The invention is herein shown in combination with a coffee maker of the type having a coffee pot designated generally by the numeral 6, which is provided with a handle 7, a pouring lip 8, and a cover 9, together with a brew top having a container 11 provided with a depressed bottom 12 around which is positioned a rubber or other gasket 13 adapted to be pressed into the top opening of the pot 6, as shown in Figure 1, the container having a depending tube 14 extending to a point adjacent the bottom of the pot 6. Advantageously the container 11 is provided with a top 15. The tube 14 is attached to the bottom 12 through a nipple 16 which, according to the invention, is provided with an inwardly projecting annular shoulder 17.

A strainer frame shown best in Fig. 3 is in this instance formed of a single piece of wire bent, as shown in Fig. 3, to provide upper and lower frame portions 18 and 19 clamped together at one side, as shown at 21, so as to space the frame members or rings. The ends of the wire are clamped together, as shown at 22, preferably at a point opposite the clamp 21, the wire extending substantially to the center of the frame whereat the wire is bent downwardly, as shown at 23, the ends of the wires extending axially beyond the lower frame member 19, as will be apparent from Fig. 2. The ends of the wire are formed in diverging relationship adjacent their extremities, as shown at 24, so as to form spring elements arranged to snap beneath the annular shoulder 17 to retain the strainer in position within the depressed bottom 12 of the container 11.

The filter fabric designated generally by the numeral 25 is made in the form of a flat, circular piece of fabric having a draw-string 26 and the size is such that when stretched over the frame by pulling the draw-string, the fabric takes the shape of the frame and forms a bag to hold the frame.

In use, the strainer is inserted in the coffee maker in the manner shown in Fig. 2, whereupon the ground coffee is placed upon the strainer within the container 11. Water is placed in the pot 6 and upon being heated sufficient pressure is generated in the top of the pot to cause the water to move up the tube 14 into the container 11. Upon cooling the coffee flows back down through the filter and tube 14 into the pot 6. It will be seen that the frame is so constructed that the strainer fabric is retained in expanded position, at all times allowing a maximum flow of the water upward through the fabric. When the direction of flow is reversed, the strainer frame serves to retain the fabric taut and prevent packing of the fabric over the bottom of the container 11, thus impeding the flow. The structure involving the two frame members 18 and 19 connected together at only one point allows a certain amount of resiliency between these members so that when the ends 24 of the frame are inserted beneath the shoulder 17 the strainer will be pressed firmly against the bottom of the container and be yieldingly held in this position. This structure also holds the bag in the desired shape. An important feature of the invention is the fact that this spacing of the frame members greatly facilitates the gripping of the strainer for its removal from the container, permitting the strainer to be frequently removed and cleaned. Furthermore, the frame structure, together with the form of the bag, permits easy replacement of the bag.

Numerous alterations and changes may be made in the structure as herein shown within the scope of the invention and I do not wish to be limited except as required by the prior art and the scope of the appended claims, in which—

I claim:

1. The combination in a coffee maker, having upper and lower chambers, and a conduit between said chambers, of a strainer frame comprising a pair of axially spaced spring loops of substantially equal radius connected together along one side, one of said loops having a resilient retaining member projecting laterally inward to the center of the loop and axially through the other loop, for reception in and engagement with the walls of said conduit to retain the frame in position across the conduit opening, and a strainer fabric covering said frame in substantial part.

2. The combination in a coffee maker, having upper and lower chambers, and a conduit between said chambers, of a strainer frame comprising a pair of axially spaced loops connected together along one side, one of said loops having a resilient retainer member projecting laterally inward from the side opposite said point of connection to the center of the loop and axially through the other loop, complemental means on the retaining member and the inner wall of said conduit for retaining the strainer in position across the conduit opening, and a strainer fabric covering said frame in substantial part.

3. The combination in a coffee maker, having spaced chambers, and a conduit between said chambers, of a strainer frame comprising spaced coaxial resilient rings of substantially equal radius, a narrow resilient connection between said rings, a pair of fingers formed to be compressed for entry into said conduit to retain the strainer in position, and a strainer fabric drawn taut over said frame to compress the same and covering at least one side and the edges of said frame.

4. The combination in a coffee maker having spaced chambers, and a conduit therebetween having an internal annular shoulder, of a filter comprising a filter fabric in the form of a bag having a drawstring, a resilient frame of wire loops for holding the bag in the shape of a short cylinder, said frame having spring elements positioned and tensioned to snap under said shoulder to yieldingly retain the strainer in position.

JOHN W. LYNCH.